(12) United States Patent
Kim

(10) Patent No.: US 7,941,518 B2
(45) Date of Patent: May 10, 2011

(54) COLLABORATION SYSTEM AND METHOD AMONG HETEROGENEOUS NOMADIC AND MOBILE COMMUNICATION NETWORKS USING GRID SERVICES

(75) Inventor: Sung-Hee Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 160 days.

(21) Appl. No.: 12/516,985

(22) PCT Filed: Nov. 20, 2007

(86) PCT No.: PCT/KR2007/005837
§ 371 (c)(1),
(2), (4) Date: May 29, 2009

(87) PCT Pub. No.: WO2008/066277
PCT Pub. Date: Jun. 5, 2008

(65) Prior Publication Data
US 2010/0077069 A1    Mar. 25, 2010

(30) Foreign Application Priority Data

Dec. 1, 2006  (KR) .................. 10-2006-0120764
May 9, 2007  (KR) .................. 10-2007-0044926

(51) Int. Cl.
*G06F 15/173* (2006.01)
(52) U.S. Cl. ............ 709/223; 709/220; 709/229; 726/1; 726/2
(58) Field of Classification Search .................. 709/223, 709/220, 229
See application file for complete search history.

(56) References Cited

U.S. PATENT DOCUMENTS

| | | |
|---|---|---|
| 2004/0193461 A1 | 9/2004 | Keohane et al. |
| 2005/0021956 A1 | 1/2005 | Genty et al. |
| 2005/0216733 A1 | 9/2005 | Keohane et al. |
| 2005/0278287 A1 | 12/2005 | Bao et al. |
| 2007/0011281 A1* | 1/2007 | Jhoney et al. .................. 709/220 |
| 2009/0271624 A1* | 10/2009 | Cao et al. ....................... 713/169 |

FOREIGN PATENT DOCUMENTS

| | | |
|---|---|---|
| JP | 2006-201896 | 8/2006 |
| KR | 10-2000-0014751 | 3/2000 |
| KR | 10-2005-0095568 | 9/2005 |
| KR | 10-2006-0054856 | 5/2006 |

OTHER PUBLICATIONS

International Search Report for PCT/KR2007/005837, mailed Feb. 14, 2008.

* cited by examiner

*Primary Examiner* — Jude J Jean Gilles
(74) *Attorney, Agent, or Firm* — Staas & Halsey LLP

(57) ABSTRACT

The present invention relates to a collaboration system and method among heterogeneous nomadic/mobile communication networks using a grid service. By using a system in which GSI (Grid Service Infrastructure) is overlaid on heterogeneous nomadic/mobile communication networks, access to resources that are accessible with different interfaces can be made with a single standard interface. Further, a vertical hand-off among heterogeneous networks and access to location information can be easily performed. In addition, mutual operationality among networks can be improved and an efficient collaboration environment can be constructed.

14 Claims, 3 Drawing Sheets

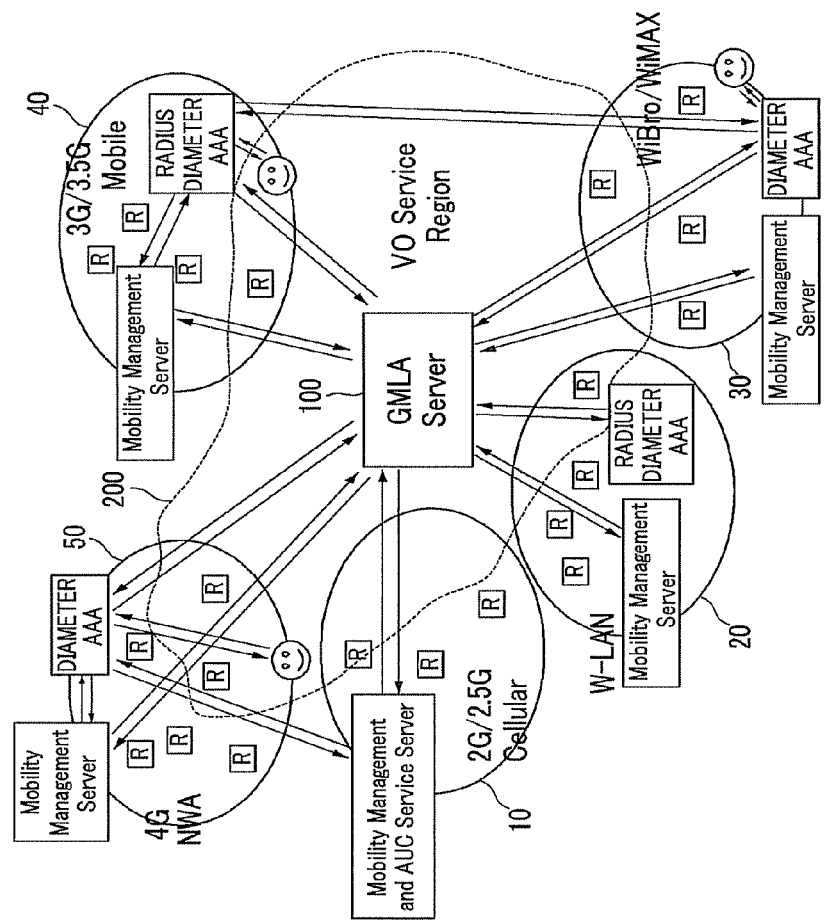
[Figure 1]

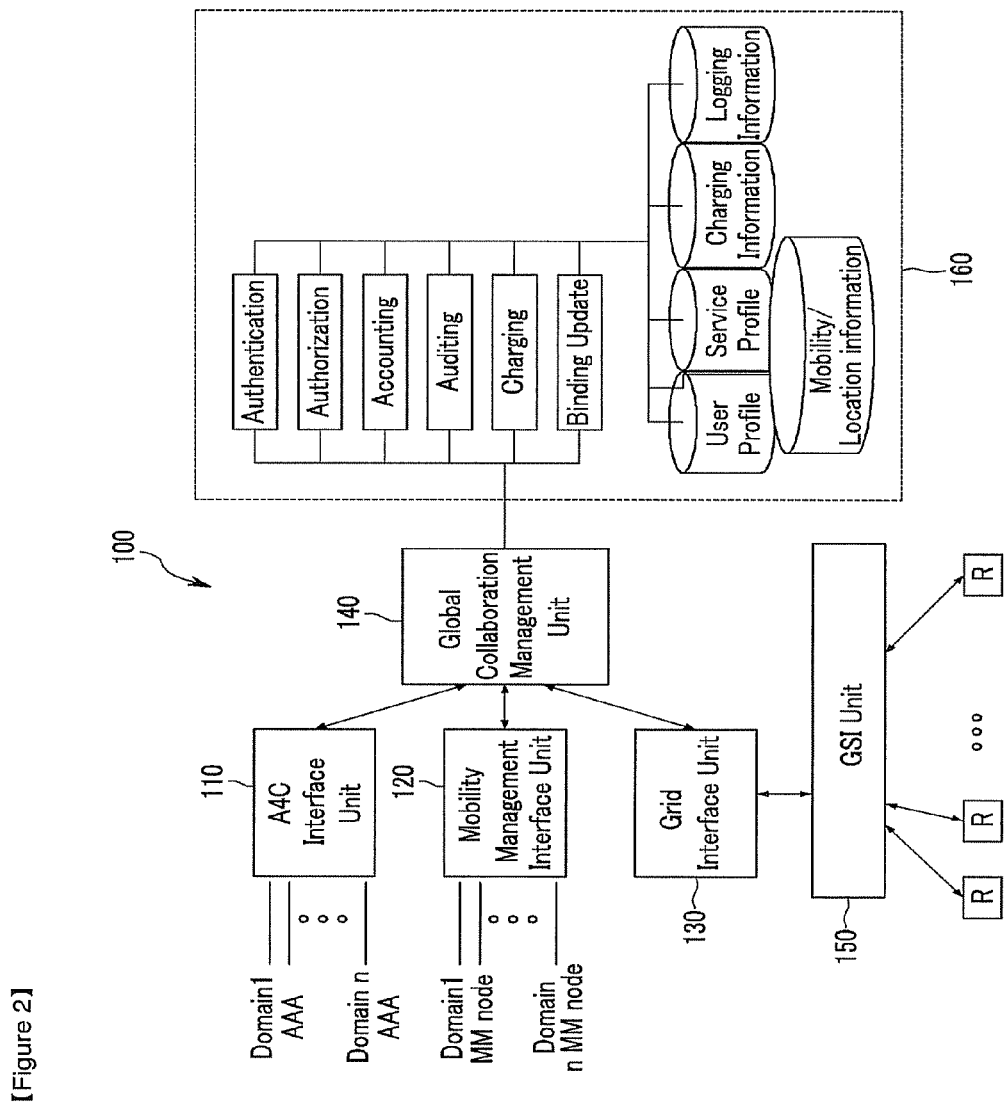
[Figure 2]

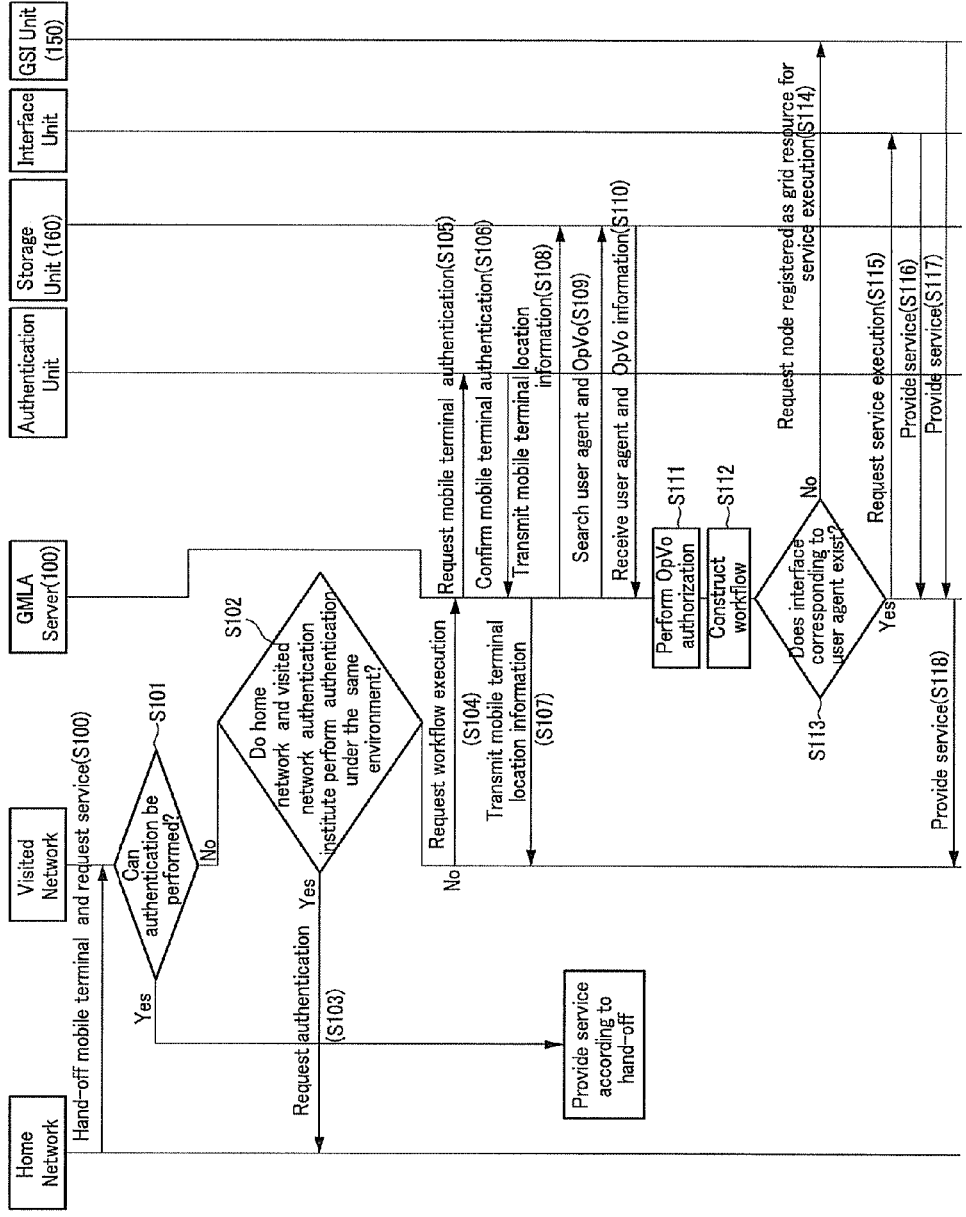
[Figure 3]

COLLABORATION SYSTEM AND METHOD AMONG HETEROGENEOUS NOMADIC AND MOBILE COMMUNICATION NETWORKS USING GRID SERVICES

CROSS REFERENCE TO RELATED APPLICATIONS

This application claims the benefit under 35 U.S.C. Section 371, of PCT International Application Number PCT/KR2007/005837, filed Nov. 20, 2007 and Korean Application Nos. 10-2006-0120764 filed Dec. 1, 2006, and 10-2007-0044926 filed May 9, 2007, the contents of all of which are incorporated herein by reference.

TECHNICAL FIELD

The present invention relates to a collaboration system and method, and in particular, to a collaboration system and method using grid services.

BACKGROUND ART

Generally, grid services are provided based on grid technologies and Web service technologies. A grid service is predominantly provided for a structure that shares resources distributed in a fixed network based on the grid computing technology, and a service execution environment. Recently, as the standard interface system that gives intelligence to a grid and is provided for various kinds of apparatuses, which are operated under different environments, Web and semantic technologies are being introduced. Further, associated scenarios, application systems, and toolkits are being researched and developed such that the grid can be used as a computing grid, a data grid, or an access grid according to the use cases.

In WSRF (Web Service Resource Framework) and OGSA (Open Grid Service Architecture) that have recently been issued, the grid service is defined as a distributed computing and data processing infrastructure that allows geographically and structurally distributed heterogeneous resources to be efficiently used using a stateful Web service. Further, access techniques that are usable in a mobile environment are being researched and developed.

In a grid system, VOs (Virtual Organizations) include individuals, groups, and institutes that temporarily or dynamically construct an integrated environment to share resources for a common goal. However, the grid systems and applications construct the virtual organizations, which are usable in the fixed network, provide required services, and support the life cycle during the execution. A method that uses mobile resources as the virtual organizations has not been suggested.

The grid service is provided for resources connected to the fixed network, and is in development to be used in a collaborative environment for applications to various fields, such as IT (Information Technology) information processing, NT (Nano Technology), and BT (Bio Technology), under different environments. As a representative example, Globus Alliance has developed application services, such as GRAM (Grid Resource Allocation and Management protocol), MDS (Monitoring and Discovery System), GSI (Grid Service Infrastructure), GASS (Grid Access to Secondary Storage), and GridFTP, base on GT (Globus Toolkit).

Further, for the HPC (High-Performance Computing) community, various kinds of tools and platforms, such as WebCom/WebCom-G, Grid Service Broker, Grid Portal SW, Grid Packaging Toolkit, MPICH-G2, Condor/Condor-G, HPC4U Middleware, Gridway metascheduler R-GMA (Relational Grid Monitoring Architecture), and NWS (Network Weather Service), have been published. As the commercial grid systems, Access Grid, gLite, IceGrid, NorduGrid, Open Science Grid, OurGrid, Sun Grid, and GRIA (Grid Resources for Industrial Applications) are provided. The new release of platforms such as WSRF.NET and the like has also been provided. The standards and APIs used in the grid are stated in WSRF, CORBA, OGSA, OGSi, and Distributed Resource Management Application API. Further, technologies for supporting the Web service have been incorporated so as to develop the technologies, such as Knowledge-Grid, Semantic-Grid, and the like.

At present, the major issue of the grid service is to use the mobile resources as grid resources while accepting wireless and mobile characteristics and requirements. To this end, a case where a user who owns a mobile phone uses the grid service through a public wireless LAN (WLAN) for a specific application, such as e-Health, is being studied.

The mobile grid is highly required for the mobility control. It is logically/functionally seen that a single domain (or network/service provider) can be made in connection with an existing mobile communication infrastructure. However, an architecture that can provide mobility control and location information under various heterogeneous nomadic/mobile communication environments is being studied as a problem to be solved for the development of the technologies.

In another technical field, for example in a nomadic/mobile communication field, 2G/3G cellular, WLAN (Wireless LAN), WiBro/WiMAX (Wireless Broadband/World Interoperability for Microwave Access), telematics, and a location-based service can be exemplified. At present, various heterogeneous systems and services are mainly provided through separate operator domains. Further, a horizontal hand-off service between operators of the same technical standards is provided according to technical characteristics of wireless transmission and service agreements.

The nomadic/mobile communication systems and services have been developed to 3.5G and 4G systems so as to support a fast wireless transmission technology, an ALL-IP-based network service, a multimedia service environment, and a personal communication service environment. Particularly, in the 4G mobile communication, research and development is being undertaken on the basis of a virtual scenario in which a service is possible such that various wireless and mobile communication systems can be incorporated. Further, the search and development are progressing to accept a pervasive communication environment.

In the 4G mobile communication, a user can receive a service in an operator domain or a service provider domain and, even if he moves to another domain, can select a service communication environment according to his service condition and continuously receive the service while mobility is secured between the domains. This is necessary in a ubiquitous environment in which various nomadic/mobile communication systems, various fixed networks, and broadcasting networks are incorporated.

In view of the service and application of nomadic/mobile communication, the key function is management of mobility and location information. At present, an individual network operator or service provider controls mobility and manages location information. Accordingly, for inter-networking between the domains or service collaboration between different kinds of networks, a vertical hand-off (Vertical HO) is required between the systems or domains using different wireless technologies. To this end, the wireless access layer has a function of supporting the vertical hand-off. Further, in the network and application layer, a problem of sharing of collaboration information between the domains that can secure personal mobility and service mobility in order to maintain a continuous service session should be resolved.

Meanwhile, location information may exist in various forms by mechanisms used in the individual nomadic/mobile communication networks. A personalized application or a custom service application requires information that can dynamically use location information of neighboring resources according to environments of mobile resources. That is, it is necessary to manage information that can be recognized according to a change in context. To this end, additional concentrated management nodes and processes are needed. Particularly, an ability to support session mobility is needed.

In the mobile communication field, a tendency in the application of the grid is still in a conceptual and experimental phase.

DISCLOSURE OF INVENTION

Technical Problem

The introduction of the grid into the mobile communication has been attempted as follows. First, the mobile communication terminals operate as an interface with respect to the grid, to thereby receive a grid application service. Second, the mobile communication terminals are shared as the grid resources.

The latter case has suggested that the general concept of a mobile communication terminal can be used as the grid resource, and has laid emphasis on portions required for operation. In this case, however, how to apply the grid computing technology to which application is not defined clearly. Specifically, there has been no suggestion of a method that uses a base station or resources in the nomadic/mobile communication systems, for example resources such as a base station and the like, other than the mobile terminal, as the grid resources.

Further, a technology based on an interface with a grid network has suggested a gateway function between a user of a mobile communication terminal and a grid system and middleware based on a replication method. Although the concept of the application of the grid to the mobile communication has been described, there is no detailed description on how to solve a problem related to mobility and location information. Further, there is no specific suggestion on how to perform a negotiation among the heterogeneous systems or domains.

The above information disclosed in this Background section is only for enhancement of understanding of the background of the invention and therefore it may contain information that does not form the prior art that is already known in this country to a person of ordinary skill in the art.

Technical Solution

The present invention has been made in an effort to provide a collaboration system among heterogeneous networks using a grid service, and a method of providing a service.

An exemplary embodiment of the present invention provides an apparatus for providing a collaboration service that applies a grid service to a node so as to provide a collaboration service among heterogeneous communication networks, each having a plurality of domains.

The apparatus includes a global collaboration management unit that provides at least one of authentication, authorization, mobility control, charging, and management services to grid participants and grid services; a GSI (Grid Service Infrastructure) unit that supports a common interface among a plurality of resources having different interfaces using grid service technologies, and supports a service for allowing the node to be used as a resource; and a grid interface unit that controls the application of the grid service to the node in connection with the GSI unit and the global collaboration management unit.

Another embodiment of the present invention provides a method of providing a service to a terminal, which moves from a first domain to a second domain, through a grid service in a collaboration system having a plurality of domains.

The method includes receiving, from the second domain, a request to execute a workflow for a service to be provided to the terminal, performing authentication on the terminal, and collecting user agent information and operative virtual organization information; requesting a node, which is registered as a grid resource, to execute the service on the basis of the user agent information and the operative virtual organization information; and providing, to the terminal, the service received from the node.

Still another embodiment of the present invention provides a method of providing a service to a terminal, which moves from a first domain to a second domain, through a grid service in a collaboration system having a plurality of domains.

The method includes receiving a request to execute a workflow from the first domain where the terminal is located, if authentication on the terminal is completed; requesting user agent information and operative virtual organization information of the terminal, if the user agent information and operative virtual organization information are received; performing authorization on an operative virtual organization, and constructing the workflow on the basis of the user agent information, if an interface corresponding to a user agent exists in an interface unit; requesting, through the corresponding interface, a service to be provided to the terminal; and receiving the service from the corresponding interface and transmitting the received service to the terminal.

BRIEF DESCRIPTION OF THE DRAWINGS

FIG. 1 is a diagram illustrating the concept of providing a virtual organization service to a plurality of communication networks in a collaboration system according to an exemplary embodiment of the present invention.

FIG. 2 is a diagram showing the configuration of a GMLA server according to an exemplary embodiment of the present invention.

FIG. 3 is a flowchart illustrating a GMLA operation according to an exemplary embodiment of the present invention.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

FIG. 1 is a diagram illustrating the concept of providing a virtual organization service to a plurality of communication networks in a collaboration system according to an exemplary embodiment of the present invention.

A collaboration system according to an exemplary embodiment of the present invention expands a grid service paradigm to various types of nomadic/mobile communication networks. The system that enables the expansion supports terminals, which receive a mobile service, in connection with heterogeneous nomadic/mobile communication networks (hereinafter, referred to as "HMN" (Heterogeneous nomadic/Mobile Network)) through a collaboration application unit (not shown) and a core network (not shown).

The collaboration application unit includes a GMLA (Global Mobility and Location Applications) layer, a GSI (Grid Service Infrastructure) layer, an MMW (Mobility Middle-Ware) layer, and an ALL-IP-based mobility/wireless communication network (AIPN: ALL Internet Protocol Network) layer.

The GMLA layer is disposed at the top and manages the overall service scenario. For example, the GMLA layer calls the GSI layer when a portion that requires the grid service technology is executed, and calls the MMW layer when a portion that requires the mobile service technology is executed.

The AIPN layer provides an environment such that other layers can execute their own functions in the core network based on the IP (Internet Protocol). The networks of domains 10, 20, 30, 40, and 50 shown in FIG. 1 are connected to each other through the AIPN layer.

The individual layers may be constructed as a server in the core network, or may be distributed by nodes according to the concept of grid computing. In the exemplary embodiment of the present invention, a case where each layer is constructed as a server is described. Referring to FIG. 1, the GMLA layer is formed as a GMLA server 100 in a VO service region 200.

At this time, the core network includes a network in which a service such as mobility management, AAA (Authentication/Authorization/Accounting) or A4C (AAA & Auditing/Charging), LRs (Location Registers), HA (Home Agent), or SIP (Session Initiation Protocol) is executed, and the VO service region shown in FIG. 1. However, the invention is not necessarily limited thereto.

As shown in FIG. 1, the GMLA server 100 in the VO service region 200 provides a virtual organization service to a mobile terminal in connection with various types of domains. In FIG. 1, as the domains, a 2G/2.5G cellular communication domain 10, a WLAN (Wireless Local Area Network) domain 20, a Wibro (Wireless broadband Internet)/WiMAX (World interoperability for Microwave Access) domain 30, a 3G/3.5G mobile communication domain 40, and a 4G NWA (Nomadic Wireless Access) domain 50 are exemplified.

The domains 10 to 50 are separate wireless/mobile communication domains, that is, regions that are operated by a mobile network operator (MNO), a mobile service provider, and a mobile virtual network operator (MVNO). The individual domains 10 to 50 serve as a home network for a corresponding subscriber and a network resource, and simultaneously provide a specialized service to the collaboration system through the AIPN layer.

The GMLA server 100 shown in FIG. 1 is connected to a GSI server, an MMW server, and an AIPN server corresponding to the GSI layer, the MMW layer, and the AIPN layer. These servers are not shown in FIG. 1.

The GMLA server 100 controls mobility of the mobile terminal and is related to position-based application/services. The GMLA server 100 supports an application scenario that allows the mobile terminal to continuously receive a service in a visited network other than the domain of the home network according to a service level agreement (SLA), and a context-based application scenario for a pervasive communication environment. To this end, the GMLA server 100 performs an AAA (Authentication, Authorization, Accounting) function on the mobile terminal when the domain receives a service request from another resource.

Further, the GMLA server 100 updates binding information or calls grid service execution to acquire or update AAA information and binding information, and transmits the result to a resource that requests the corresponding service. Here, the binding information is information that is used to support better communication while the mobile terminal is moving when the grid service is executed. The binding information includes information regarding the current position of the mobile terminal.

The individual domains 10 to 50 shown in FIG. 1 serve as the home network for each subscriber and network resource in an inter-HMN collaboration network and simultaneously support a specialized network service for the mobile terminal through the AIPN server. Further, the individual domains 10 to 50 include a node (for example a mobility management node) that operates in the MMW server. Accordingly, it is possible to provide a local subscriber authentication service, an authorization service, or a mobility control service to the mobile terminal.

For a situation in which a user of another domain visits the network of the domain, it is possible to consider two cases, that is, a case where both domains have the same communication mechanism between the authentication servers (for example an AAA server) and a case where they have different communication mechanisms. First, a case where both domains have the same communication mechanism between the authentication servers will be described. Here, a subscriber accesses the visited network. At this time, when a local AAA server located in the visited network does not perform authentication on the subscriber, the local AAA server requests subscriber information and authentication and authorization information from the AAA server of the home network to which the subscriber belongs. Subsequently, the local AAA server receives a corresponding response. At this time, if the subscriber is a subscriber of a domain according to the agreement, the local AAA server permits access of the subscriber to the network, and stores the binding information in the mobility management node or updates the binding information.

Meanwhile, when the subscriber is not a subscriber of a domain according to the agreement, the local AAA server performs the authentication procedure on the subscriber in connection with the home AAA server in which the corresponding subscriber is registered.

Second, a case where both domains have different communication mechanisms between the AAA servers will be described. For example, when the AAA server of the home network to which the subscriber belongs is a RADIUS server or an authentication center server, and the AAA server of the visited network is a diameter server, it may be difficult for the two AAA servers to directly exchange information. In this case, the authentication procedure on the subscriber is performed using a grid service through the GMLA server, which will be described below with reference to FIG. 2.

In both cases described above, mobility binding information is stored/updated in a mobility management registry of the GMLA server 100, and is also stored/updated in the mobility management server of the corresponding domain. Accordingly, consistency of information is secured. Then, in order to perform authentication on a specific application or to acquire authorization and mobility information, a corresponding procedure can be fully performed through the GMLA server 100.

The VO service region 200 represents a mobile grid virtual organization service, and the GMLA server 100 is located at the center of the VO service region 200. A logic sequence, which is required for mobility control of a subscriber that visits another domain or a subscriber that performs a vertical hand-off, is executed through the GMLA server 100. In addition, when the resources (represented by a symbol 'R' in FIG. 1) request location information, the GMLA server 100 acquires the corresponding location information and transmits the acquired location information in response to the requests.

To this end, the GMLA server 100 includes an A4C (Authentication, Authorization, Accounting, Auditing, and Charging) function, a mobility management function, and a registry for storing and updating associated information. Here, the registry refers to a database shown in FIG. 2, which will be described below.

The GSI server generates and operates a base virtual organization (BVO) for various types of domains that participate in the collaboration system, and supports membership management, policy management, and participant registry functions.

According to the request of the application, the base virtual organization generates an operative virtual organization (OpVO) corresponding to the application. For example, when mobility information is requested, Mobility_Info_OpVO (Mobility Information Operative VO) is generated. When subscriber authentication or application service authentication information is requested, A4C_OpVO (A4C Operative VO) is generated. When location information or context information is requested, Location_OpVO (Location Operative VO) is generated. Then, the corresponding workflow is executed. The OpVO is generated each time the service is requested. In addition, the user agent and the service agent are generated and continuously executed until the lifetime is expired, that is, until the requested workflow is completed.

In the exemplary embodiment of the present invention, the base virtual organization and the operative virtual organization can operate with an overlay network, in which a Web service is possible. Here, the overlay network means a logical network that is constructed according to the purpose of the service on the basis of an existing physical network. For example, when the Internet is a network that realizes services, such as the Web and the like, on a physical network having a plurality of routers, the Internet can be regarded as an overlay network. Accordingly, if the HMN represents heterogeneous networks having various types of domains, the GSI server does not have a separate physical network but has a structure that is overlaid on the HMN infrastructure to realize the grid service over the existing HMN.

In the base virtual organization and the operative virtual organization, it is assumed that various heterogeneous nomadic/mobile communication domains participate therein. Therefore, in order to easily perform identifier and context management for the participating domains and the virtual organization resource, a hub and spoke topology may be constructed. Further, when direct communication between mobile communication resources is requested, the BVO and the OpVO can support a P2P (peer-to-peer) topology.

The functional configuration of the GMLA server that supports the above-described functions will be described with reference to FIG. 2.

FIG. 2 is a diagram showing the configuration of a GMLA server according to an exemplary embodiment of the present invention.

As shown in FIG. 2, the GMLA server 100 includes an A4C interface unit 110, a mobility management interface unit 120, a grid interface unit 130, a global collaboration management unit 140, a GSI (Grid Service Infrastructure) unit 150, and a storage unit 160. The GMLA server 100 provides a grid service to a terminal that is in connection with a GSI server (not shown), an MMW server (not shown), and an AIPN server (not shown).

A GSI server basically provides grid middleware, a GrSDS (Grid Service Discovery Service), and a grid application support service. Further, the GSI server supports the management of the base virtual organization and the operative virtual organization related to the GMLA server 100, and the execution of the workflow. In addition, the GSI server supports the OGSA (Open Grid Service Architecture) and WSRF (Web Services Resource Framework) standards. According to the exemplary embodiment of the present invention, the GSI server supports the management of the participating domains and registry of membership, generation of the workflow, execution of the grid service, SLA negotiation, and virtual organization operation.

The MMW server is a mobile communication service platform, and executes a wireless Internet service, an IMS (IP Multimedia Subsystem), A4C, SIP (Service Initiation Protocol), HA (Home Agent), an HSS (Home Subscriber System), an HLR (Home Location Register), context management, QoS, security functions, and authentication/authorization on the network and grid application, session management, and location information acquisition services.

The AIPN server supports access to various types of wireless access networks while centering around an IP core network. In addition, the AIPN server accepts IP mobility, particularly IPv6 mobility, and includes a network management function. The AIPN server supports roaming and hand-off of the mobile network and QoS management with a mobility management function that manages movement and location information peculiar to each mobile communication/wireless network.

The A4C interface unit 110 is needed to allow the GMLA server 100 to perform an authentication function on individual domains. Generally, a RADIUS (Remote Authentication Dial In User Service), a diameter, or a SCTP (Stream Control Transmission Protocol) interface is used as the A4C interface unit 110. In the exemplary embodiment of the present invention, a diameter is used. The A4C interface unit 110 is connected to an authentication unit (not shown) to perform authentication on a mobile terminal. At this time, the authentication unit may be implemented in the GMLA server 100 or may be implemented separately from the GMLA server 100. Alternatively, an authentication server having heterogeneous protocols may be used. However, the invention is not necessarily limited thereto.

The mobility management interface unit 120 is needed to allow the GMLA server 100 to provide mobility information and location information requested by the individual domains. An interface with an authentication client having a different protocol is provided based on a Web service protocol. Further, an IP mobility service or a diameter may be used.

The mobile communication application that requires the service session management or the global mobility management over all networks, the SIP application, or the resources for executing the functions may become a client of the A4C interface unit 110 based on the mobility and location information of the mobile terminals, which are not managed by their own domain and join another domain. At this time, under the P2P communication environment or an ad hoc communication environment, the mobile terminal becomes the resource.

Further, the resources can be used as the grid resources according to the request of the GMLA server 100. At this time, the resources can be used as redirect or proxy servers according to the purposes. Here, the resources include an HA (Home Agent), an AP (Access Point), an HSS (Home Subscriber Server) for the SIP (Session Initiation Protocol) application, a CSCF (Call Session Control Function) node, an SGSN (Serving GPRS (General Packet Radio Service) Support Node)/GGSN (Gateway GPRS Support Node) of the cellular mobile communication. Accordingly, the resources can be used as the servers.

This expands a viewpoint that only the mobile terminal is used as the grid resource, which can be used in the HMN. The collaboration system according to the exemplary embodiment of the present invention registers the resources in the GrSDS as the services, and generates the base virtual organization and the operative virtual organization for each network domain. Then, the service user can use the resources according to the grid service procedure. Therefore, various types of servers including the mobile terminal can be sufficiently used as the grid resource.

In the cellular mobile communication, a base station/base control station for executing an FA (Foreign Agent) or mobility management function, an SGSN (Serving GPRS Support Node)/GGSN (Gateway GPRS Support Node), and a PDSN (Packet Data Serving Node) are included in the GSI. In the WLAN or WiMAX/WiBro, AP and PAR are included in the GSI. Further, the nodes, such as HA, HSS, and MME, which manage the mobility management function of the overall network, may be included in the GSI.

In addition, for the applications based on location information, such as the SIP application of the IMS, service discovery, context management, and telemetics, an associated positioning node, a location database node, and the like may be included. In the exemplary embodiment of the present invention, various types of workflows can be implemented by a business process enactor in the GMLA server 100 according to the applications.

The grid interface unit 130 has a function of controlling the global collaboration management unit 140 and the GSI unit 150 described below to provide the grid service in connection with each other.

The global collaboration management unit 140 executes a function of connecting a local domain and a grid domain by performing and controlling the function of the GMLA server 100. The global collaboration management unit 140 provides authentication, authorization, mobility control, charging, and management services for the grid participants and the services. The local domain is a domain that can provide a service through the mobile communication network nodes, and the grid domain is a domain that provides a service using the grid service technology.

Further, the global collaboration management unit 140 is a mobile grid platform, and includes an inter-HMN mobility and location information application service layer, a grid service-based infrastructure layer, a mobility middleware layer, and an ALL-IP-based mobility/wireless communication network layer. Here, the individual layers may be implemented by a signal server or an integrated server, or may be implemented separately from each other.

Meanwhile, in addition to the applications according to the exemplary embodiment of the present invention, the procedures for general grid computing application directly requested by a user having a membership are supported on the basis of the principles and ability of the general grid service. That is, in order to support the general grid computing applications, in addition to a process of accessing the GMLA server 100, management process execution procedures, such as registration of an application program, search of an application program, selection of a method of outputting an application program execution result, selection of the usable mobile resources as the grid resources and determination of use costs, workflow execution, and charging according to the work result, are included.

The GSI unit 150 executes the following two functions. One is a function that supports a common interface among the resources having different interfaces using the grid service technology, and the other is a function that supports a service for allowing the mobile terminal to be used as in the general grid computing or mobile grid field.

In order to execute the first function, the GSI unit 150 supports the grid service technology in connection with the grid interface unit 130, the GSI unit 150, the global collaboration management unit 140, and a plurality of components. Further, in order to execute the second function, the GSI unit 150 has the same configuration as the general grid computing processing unit. Accordingly, in the exemplary embodiment of the present invention, a detailed description thereof will be omitted.

The storage unit 160 is connected to the global collaboration management unit 140. The storage unit 160 stores information collected from a plurality of interface units 110, 120, and 130 or information that is required for allowing the GSI unit 150 to support the grid service technology. The information stored in the storage unit 160 includes A4C information on the user of the mobile terminal, updated binding information, user profile, service profile, logging information, mobility/location information, and access information. However, the invention is not necessarily limited thereto.

The global collaboration management unit 140 that executes the above-described functions may be implemented in the GMLA server 100 or may be provided separately from the GMLA server 100. This can be changed in various ways according to traffic capacity or development plans when the network is designed.

A general service execution procedure in the HMN environment having the above-described configuration and features will be described with reference to FIG. 3.

A method of constructing and operating a mobile virtual organization (VO) according to an exemplary embodiment of the present invention may be a method of providing mobility management, location information acquisition, and authentication and authorization services to the mobile terminal. In order to provide the service to the mobile terminal, the system includes the base virtual organization and the operative virtual organization. The base virtual organization includes subscription and registration by domains participating in the collaboration among the heterogeneous networks, membership management, and registry operation. The operative virtual organization includes mobility management, location information acquisition, and authentication and authorization, and executes the functions in a 1:1 or 1:N manner according to the requested workflow.

FIG. 3 is a flowchart illustrating a GMLA operation according to an exemplary embodiment of the present invention.

As shown in FIG. 3, a procedure for executing a service in the HMN environment according to an exemplary embodiment of the present invention includes the steps of causing a service requester to call a base virtual organization manager, causing the base virtual organization manager to request authentication from the A4C server, searching associated user agent and operative virtual organization from a participant registry, requesting authorization on the corresponding operative virtual organization through the user agent, calling a workflow manager, calling a corresponding service agent, requesting the grid resources to execute the service, recognizing and notifying a change of a context, and reflecting the context and executing the workflow.

The steps will now be described in detail. The mobile terminal that moves from the home network (the first network) to the visited network (the second network) requests a hand-off and requests a service in order to receive the service from the visited network even after the hand-off (Step S100). An authentication institute of the visited network, that is, the AAA server, determines whether or not authentication can be performed on the mobile terminal that moves from the home network (Step S101).

If the AAA server of the visited network can perform the authentication on the mobile terminal, after the authentication on the terminal is performed, the service is continuously provided to the mobile terminal through a generally known hand-off process. Meanwhile, if the AAA server of the visited network cannot perform the authentication on the mobile terminal, the visited network determines whether or not its own AAA server and the AAA server as the authentication institute of the home network perform the authentication under the same environment (Step S102).

At this time, since the visited network provides information on its own AAA server during the hand-off of the mobile terminal from the home network, it is possible to determine whether or not the AAA server performs the authentication under the same environment on the basis of the information. If the home network and the visited network have the same AAA server environment, the AAA server of the visited network requests the AAA server located in the home network of the mobile terminal to provide authentication information on the mobile terminal (Step S103). The AAA server of the visited network that receives the authentication information of the mobile terminal from the AAA server of the home network performs the authentication on the mobile terminal, and then provides the service to the mobile terminal through the hand-off process.

Meanwhile, when the home network and the visited network do not have the same AAA server environment, for example when the AAA server of the home network is either a RADIUS server or an authentication center server, and the AAA server of the visited network is a diameter server, it is difficult for the two AAA servers to directly exchange information. Therefore, the AAA server of the visited network requests the execution of the workflow in a grid service manner through the GMLA server (Step S104).

The GMLA server 100 that is requested to execute the workflow calls the base virtual organization manager in order to perform the authentication on the mobile terminal, and requests the authentication on the mobile terminal. Then, the base virtual organization called by the GMLA server 100 requests the A4C server, that is, the authentication unit, to perform authentication on a service user who owns the mobile terminal through the A4C interface unit 110 (Step S105). At this time, when the system is designed, a portion that requests the authentication may be designed to request the authentication from the authentication unit through the global collaboration management unit 140. Further, the portion may be designed to directly request the authentication through the A4C functions in the global collaboration management unit 140. In the exemplary embodiment of the present invention, a case where the GSI server and the GMLA server are provided as separate servers will be described. However, the invention is not necessarily limited thereto.

When the authentication of the service requester is completed, the GMLA server 100 transmits the location information of the service requester received during the authentication to the mobility management server of the visited network (Step S107) to be stored and updated. The GMLA server 100 also transmits the location information to the mobility/location database of the storage unit 160 (Step S108) to be stored and updated. If this process is completed, the GMLA server 100 accesses the participant registry in the storage unit 160, in which the user profile is stored, searches user agent information and operative virtual organization information associated with the service requester (Step S109), and receives the corresponding information from the storage unit 160 (Step S110). Here, as the participant registry, the user profile database in the storage unit may be used or a separate database server may be constructed. In the exemplary embodiment of the present invention, a description will be given by way of the user profile database in the storage unit.

It is verified whether to add the service requester as the member of the corresponding operative virtual organization or to give permission for the service on the basis of the user agent information related to the service requester, which is obtained as the search result of the user profile database by the GMLA server 100 (Step S111). Further, on the basis of the authorization result at Step S111, the GMLA server 100 constructs an associated workflow according to whether the location information or the mobility information of the service requester is requested, or whether another service is requested (Step S112), and calls individual service agents according to the constructed workflow.

When the service agent is called, the GMLA server 100 determines whether or not an interface corresponding to the user agent exists (Step S113). If the corresponding interface (for example a mobility management interface or an A4C interface) is found, the GMLA server 100 requests the nodes needed to provide the service to execute the service through the interface (Step S115). Meanwhile, when the interface corresponding to the user agent does not exist, the GMLA server 100 requests the nodes registered as the grid resource, for example the SIP PA or the positioning node, to execute the service through the grid interface unit 130 (Step S114).

Next, the GMLA server receives the service from the nodes, which request the execution of the service, (Steps S116 and S117) and provides the service to the mobile terminal (Step S118). FIG. 3 illustrates a case where Steps S114 to S117 are sequentially executed, but the invention is not limited thereto.

In the exemplary embodiment of the present invention, a method that can continuously receive the service through the grid service during the hand-off of the mobile terminal has been described. In addition, the service can be provided in the same manner as described above.

Here, a program for executing the functions corresponding to a configuration of the exemplary embodiment of the present invention or a recording medium having the program recorded thereon also falls within the scope of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the above-described exemplary embodiment, on an environment of various heterogeneous nomadic/mobile communication networks, access to resources that are accessible with different interfaces can be achieved with a single interface.

Further, the load on mutual operationality among complicated networks can be reduced by integrating mobility management and authentication management on the mobile terminal, and thus an efficient collaboration environment can be constructed.

In addition, the resources in the heterogeneous nomadic/mobile communication networks as well as grid computing can be used as the mobile grid resources.

The invention claimed is:

1. An apparatus for providing a collaboration service that applies a grid service to a node so as to provide a collaboration service among heterogeneous communication networks, each having a plurality of domains, the apparatus comprising:
 a global collaboration management unit that provides at least one of authentication, authorization, mobility control, charging, and management services on grid participants and grid services;
 a GSI (Grid Service Infrastructure) unit that supports a common interface among a plurality of resources having different interfaces using grid service technologies, and supports a service for allowing the node to be used as a resource; and
 a grid interface unit that controls the application of the grid service to the node in connection with the GSI unit and the global collaboration management unit.

2. The apparatus of claim 1, wherein the global collaboration management unit provides the grid service to the node, and provides a context-based application scenario for a pervasive communication environment according to a service level agreement.

3. The apparatus of claim 1, further comprising:
 a first interface unit that transmits an authentication request for an individual domain of the node to the global collaboration management unit;
 a second interface unit that transmits mobility information and location information requested by the individual domain to the global collaboration management unit; and
 a storage unit that stores at least one of a user profile, a service profile, a charging and logging profile, and a binding information profile required for the authentication, authorization, mobility control, charging, and mobility management.

4. The apparatus of claim 3, wherein:
 the first interface unit performs an interface with an AAA (Authentication/Authorization/Accounting) or A4C (AAA & Auditing/Charging) client in each of the plurality of domains; and
 the second interface unit performs an interface with a mobility management node in each of the plurality of domains.

5. The apparatus of claim 2, wherein the storage unit comprises:
 an authentication unit that stores at least one of authentication information, authorization information, auditing information, accounting information, and charging information on a user of the terminal; and
 a binding update unit that updates and stores binding information to be used for mobility management of the terminal, the binding information being information to be used to execute the grid service.

6. A method of providing a service to a terminal that moves from a first domain to a second domain through a grid service in a collaboration system having a plurality of domains, the method comprising:
 receiving, from the second domain, a request to execute a workflow for a service to be provided to the terminal;
 performing authentication on the terminal, and collecting user agent information and operative virtual organization information;
 requesting a node that is registered as a grid resource to execute the service on the basis of the user agent information and the operative virtual organization information; and
 providing, to the terminal, the service received from the node,
 wherein the collaboration system manages operative virtual organizations according to services with respect to the plurality of domains.

7. The method of claim 6, further comprising collecting authentication information on the terminal through the grid service.

8. The method of claim 6, wherein the requesting comprises:
 performing authorization on the basis of the collected operative virtual organization information; and
 constructing the workflow on the basis of the authorization result.

9. The method of claim 8, wherein, before receiving the request to execute the workflow, the second domain:
 determines of whether or not authentication can be performed on the terminal that moves from the first domain;
 determines whether or not an authentication institute of the first domain is the same as an authentication institute of the second domain if authentication is not performed on the terminal; and
 requests to execute the workflow when the authentication institute of the first domain is not the same as the authentication institute of the second domain.

10. The method of claim 9, further comprising:
 when the authentication institute of the first domain is the same as the authentication institute of the second domain, requesting the authentication institute of the first domain to perform authentication on the mobile terminal; and
 receiving authentication information on the mobile terminal.

11. The method of claim 6, wherein the node includes a resource in the first domain or the second domain.

12. The method of claim 6, wherein the collecting comprises transmitting location information of the terminal collected during the authentication to the second domain and updating the authentication information if authentication on the terminal is completed.

13. A method of providing a service to a terminal that moves from a first domain to a second domain, through a grid service in a collaboration system having a plurality of domains, the method comprising:
 receiving a request to execute a workflow from the first domain where the terminal is located;
 if authentication on the terminal is completed, requesting user agent information and operative virtual organization information of the terminal;
 if the user agent information and operative virtual organization information are received, performing authorization on an operative virtual organization, and constructing the workflow on the basis of the user agent information;

if an interface corresponding to a user agent exists in an interface unit, requesting, through the corresponding interface, a service to be provided to the terminal; and receiving the service from the corresponding interface and transmitting the received service to the terminal.

14. The method of claim 13, wherein, if the corresponding interface does not exist in the interface unit, the requesting of the service comprises:

requesting a node that is registered as a grid resource to execute the service; and receiving the executed service through the node and transmitting the service to the terminal.

* * * * *